US010567384B2

United States Patent
Kang et al.

(10) Patent No.: US 10,567,384 B2
(45) Date of Patent: Feb. 18, 2020

(54) VERIFYING WHETHER CONNECTIVITY IN A COMPOSED POLICY GRAPH REFLECTS A CORRESPONDING POLICY IN INPUT POLICY GRAPHS

(71) Applicant: Hewlett Packard Enterprise Development LP, Houston, TX (US)

(72) Inventors: Joon-Myung Kang, Palo Alto, CA (US); Mario Antonio Sanchez, Palo Alto, CA (US); Ying Zhang, Palo Alto, CA (US); Anu Mercian, Santa Clara, CA (US); Raphael Amorim Dantas Leite, Santa Clara, CA (US); Sujata Banerjee, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 82 days.

(21) Appl. No.: 15/686,552

(22) Filed: Aug. 25, 2017

(65) Prior Publication Data
US 2019/0068598 A1 Feb. 28, 2019

(51) Int. Cl.
*H04L 29/06* (2006.01)
*G06F 21/57* (2013.01)
(Continued)

(52) U.S. Cl.
CPC ............ *H04L 63/10* (2013.01); *G06F 21/577* (2013.01); *G06F 21/604* (2013.01); *H04L 63/20* (2013.01); *H04L 43/04* (2013.01); *H04L 63/0263* (2013.01)

(58) Field of Classification Search
CPC ...................................................... H04L 63/10
(Continued)

(56) References Cited

U.S. PATENT DOCUMENTS 7,870,238 B2 * 1/2011 Pusateri ................ H04L 41/022
370/230
9,253,038 B2 * 2/2016 Bhatt ................... H04L 41/0853
(Continued)

FOREIGN PATENT DOCUMENTS

| WO | 2016/072996 A1 | 5/2016 |
| WO | WO-2016186605 A1 | 11/2016 |
| WO | 2017/014770 A1 | 1/2017 |

OTHER PUBLICATIONS

Banikazemi et al., "Meridian: An SDN Platform for Cloud Network Services", 2013 (Year: 2013).*
(Continued)

*Primary Examiner* — Ondrej C Vostal
(74) *Attorney, Agent, or Firm* — Hewlett Packard Enterprise Patent Department (57) ABSTRACT

Example method includes: receiving, by a network device, a plurality of input policy graphs and a composed policy graph associated with the input policy graphs; dividing the composed policy graph into a plurality of sub-graphs, each sub-graph comprising a plurality of edges and a plurality of source nodes and destination nodes that the edges are connected to; selecting a first subset of sub-graphs that include, as a source node, a disjoint part of an original source EPG for each input policy graph; identifying a second subset within the first subset of sub-graphs that include, as a destination node, a disjoint part of an original destination EPG for the each input policy graph; and verifying whether connectivity in the composed policy graph reflects a corresponding policy in the plurality of input policy graphs for each sub-graph in the second subset.

18 Claims, 9 Drawing Sheets

(51) Int. Cl.
*G06F 21/60* (2013.01)
*H04L 12/26* (2006.01)

(58) Field of Classification Search
USPC .......................................................... 709/225
See application file for complete search history.

(56) References Cited

U.S. PATENT DOCUMENTS

| | | | | |
|---|---|---|---|---|
| 9,565,163 | B1* | 2/2017 | Arvind | H04L 63/0245 |
| 10,084,806 | B2* | 9/2018 | Ward | H04L 63/1433 |
| 2003/0174165 | A1* | 9/2003 | Barney | G06T 11/206 |
| | | | | 715/747 |
| 2003/0195885 | A1* | 10/2003 | Emmick | G06F 16/86 |
| 2004/0268213 | A1* | 12/2004 | Chan | G06F 8/70 |
| | | | | 715/272 |
| 2007/0021952 | A1* | 1/2007 | Saito | G16B 40/00 |
| | | | | 703/11 |
| 2007/0255769 | A1* | 11/2007 | Agrawal | G06Q 10/06 |
| 2008/0104665 | A1* | 5/2008 | Naldurg | G06F 21/577 |
| | | | | 726/2 |
| 2009/0046732 | A1* | 2/2009 | Pratt, Jr. | H04L 12/66 |
| | | | | 370/406 |
| 2009/0059814 | A1* | 3/2009 | Nixon | H04L 41/12 |
| | | | | 370/254 |
| 2009/0249431 | A1* | 10/2009 | McCollum | G06F 21/10 |
| | | | | 726/1 |
| 2012/0023546 | A1* | 1/2012 | Kartha | H04L 63/104 |
| | | | | 726/1 |
| 2012/0084422 | A1* | 4/2012 | Bandi | H04L 41/5045 |
| | | | | 709/223 |
| 2012/0166604 | A1* | 6/2012 | Fortier | H04L 41/0893 |
| | | | | 709/223 |
| 2014/0122670 | A1* | 5/2014 | Levy | H04L 41/0893 |
| | | | | 709/220 |
| 2014/0280936 | A1* | 9/2014 | Nandagopal | H04L 67/22 |
| | | | | 709/225 |
| 2015/0063102 | A1* | 3/2015 | Mestery | H04L 41/12 |
| | | | | 370/230 |
| 2015/0124645 | A1* | 5/2015 | Yadav | H04L 41/0806 |
| | | | | 370/254 |
| 2015/0186427 | A1* | 7/2015 | Logothetis | G06F 16/9024 |
| | | | | 707/776 |
| 2015/0381515 | A1* | 12/2015 | Mattson | H04L 41/145 |
| | | | | 707/609 |
| 2016/0043952 | A1* | 2/2016 | Zhang | H04L 67/16 |
| | | | | 709/223 |
| 2016/0063394 | A1* | 3/2016 | Gokalp | G06F 16/951 |
| | | | | 706/12 |
| 2016/0080195 | A1* | 3/2016 | Ramachandran | G06F 16/285 |
| | | | | 370/220 |
| 2016/0149804 | A1* | 5/2016 | Mirza | H04L 45/306 |
| | | | | 370/392 |
| 2016/0188748 | A1* | 6/2016 | Neumann | G06F 16/9024 |
| | | | | 707/747 |
| 2016/0191345 | A1* | 6/2016 | Despotovic | H04L 41/5006 |
| | | | | 709/226 |
| 2016/0211988 | A1* | 7/2016 | Lucas | H04L 45/22 |
| 2016/0359697 | A1* | 12/2016 | Scheib | H04L 63/1425 |
| 2016/0359915 | A1* | 12/2016 | Gupta | H04L 43/04 |
| 2017/0155658 | A1* | 6/2017 | Mullins | H04L 63/0807 |
| 2017/0177367 | A1* | 6/2017 | DeHon | G06F 9/30101 |
| 2017/0264643 | A1* | 9/2017 | Bhuiyan | G06F 17/271 |
| 2017/0371870 | A1* | 12/2017 | Eck | G06F 17/2836 |
| 2018/0053327 | A1* | 2/2018 | Contractor | G06T 11/206 |
| 2018/0278505 | A1* | 9/2018 | Sarin | H04W 12/08 |
| 2018/0288190 | A1* | 10/2018 | Lyons | H04L 47/803 |
| 2018/0316576 | A1* | 11/2018 | Kang | H04L 41/5003 |
| 2018/0367449 | A1* | 12/2018 | Pani | H04L 45/48 |

OTHER PUBLICATIONS

Casado et al., "Abstractions for Software-Defined Networks", 2014 (Year: 2014).*
Fayazbakhsh et al., "Enforcing Network-Wide Policies in the Presence of Dynamic Middlebox Actions using FlowTags", 2014 (Year: 2014).*
Gember-Jacobson et al., "Fast Control Plane Analysis Using an Abstract Representation", 2016 (Year: 2016).*
GitHub, "Group-based Policy Abstractions for Neutron", 2015 (Year: 2015).*
Miseldine et al., "Automated XACML Policy Reconfiguration for Evaluation Optimisation", 2008 (Year: 2008).*
Monsanto et al., "Composing Software-Defined Networks", 2013 (Year: 2013).*
Prakash et al., "PGA: Using Graphs to Express and Automatically Reconcile Network Policies", 2015 (Year: 2015).*
Xia et al., "Abstraction-carrying Code", 2003 (Year: 2003).*
D. Siracusa; "ACINO: ApplicationCentric IP/Optical Network Orchestration (D1.1)," 2015, pp. 1-5 [online], [retrieved on May 22, 2017]. Retrieved from the Internet: <URL: http://www.acino.eu./?page_id=102>.
Sridhar Rao, "SDN Series Part Seven: ONOS," Mar. 3, 2015, pp. 1-7 [online]. [retrieved on May 22, 2017]. Retrieved from the Internet:<URL: https://thenewstack.io/open-source-sdn-controllers-part-vii-onos/>.
Yongning Tang et al., "Automatic Belief Network Modeling via Policy Inference for SDN Fault Localization," Journal of Internet Services and Applications, Jan. 20, 2016, pp. 1-19 [online], [retrieved on May 22, 2017]. Retrieved from the Internet: <URL: https:/jisajournal.springeropen.com/articles/10.1186/s13174-016-0043-y>.

* cited by examiner

VERIFYING WHETHER CONNECTIVITY IN A COMPOSED POLICY GRAPH REFLECTS A CORRESPONDING POLICY IN INPUT POLICY GRAPHS

BACKGROUND

Intent-based management systems may provide high-level abstraction for managing complex target infrastructure by focusing not on how to do a task, but on what to do. Many approaches can handle high-level intents using high-level programming languages (such as, XML, JSON, Datalog, etc.), tables, or graphs. However, these approaches cannot verify the correctness of the intents and cannot perform troubleshooting by queries at the intent level.

BRIEF DESCRIPTION OF THE DRAWINGS

The following detailed description references the drawings, wherein.

DETAILED DESCRIPTION

Policy Graph Abstraction (PGA) can be an example application-level graph model that enables proactive, automatic composition of individual policies before deploying the policies into the network. Using this graph-based structure, PGA can automatically detect and resolve policy conflicts in intent-based management systems.

PGA's composed policy graph may be correct by design in terms of conflict resolution of the intents expressed by independently specified network policies in a plurality of input policy graphs. However, the original network policies may not indeed be preserved in the composed policy graph in some cases. In other cases, the composition may lead to inadvertent introduction of additional edges in the composed policy graph. Such unintended edges in the composed policy graph may allow communications between endpoints that are otherwise not allowed to communicate to each other. Additionally, the composition engine itself may contain defects that can cause errors in the composed policy graph. Therefore, examples in the present disclosure can provide a method to verify the correctness of the composed policy graph before it is deployed.

Moreover, after verifying the composed policy graph at a logical level, an example system can verify that the input intents in the plurality of input policy graphs are correctly reflected in the resulting composed policy graph. Nevertheless, a large number of potential sources may lead to errors when dealing with network policy management. For example, there could be errors in the input policies, errors in end point group (EPG) mapping, errors in the composition itself, errors in Openflow rule generation and installation, errors in the configuration of network functions, etc. Therefore, a multi-layer troubleshooting approach can be adopted to answer the connectivity-related questions both at a policy level and at an infrastructure level.

Furthermore, there may be value in providing reasoning capabilities about why an observed network state happens according to specified input policies. Such capabilities may provide for faster recovery times and dynamic fail-over mechanisms. Even if identifying the exact cause of a connectivity issue is not feasible in some cases, being able to identify a probable cause for the connectivity issue still can provide valuable information. For example, the example system may answer questions, such as, can a specified network function generating the connectivity issue be pinpointed during troubleshooting? The example system can also answer what-if type questions at a policy level. For example, the example system may answer questions, such as, when a new input policy is introduced or an existing input policy is removed, how does the addition or removal of the input policy affect the composed policy graph?

Examples described herein include a method for receiving a plurality of input policy graphs and a composed policy graph associated with the input policy graphs; dividing the composed policy graph into a plurality of sub-graphs, each sub-graph comprising a plurality of edges and a plurality of source nodes and destination nodes that the edges are connected to; selecting, by the network device, a first subset of sub-graphs that include, as a source node, a disjoint part of an original source end point group (EPG) for each input policy graph; identifying a second subset within the first subset of sub-graphs that include, as a destination node, a disjoint part of an original destination EPG for the each input policy graph; and verifying whether connectivity in the composed policy graph reflects a corresponding policy in the plurality of input policy graphs for each sub-graph in the second subset.

Moreover, the example method may also include verifying whether connectivity in a composed policy graph reflects a corresponding policy in a plurality of input policy graphs; identifying, in the composed policy graph, a first original end point group (EPG) to which a source endpoint in an input policy graph corresponds; identifying, in the composed policy graph, a second original EPG to which a destination endpoint in the input policy graph corresponds; determining whether both the first original EPG and the second original EPG are associated with an input policy allowing communications between the original EPGs; and indicating the input policy in the composed policy graph if the input policy allows the communication between the original EPGs exists.

Figure 1:
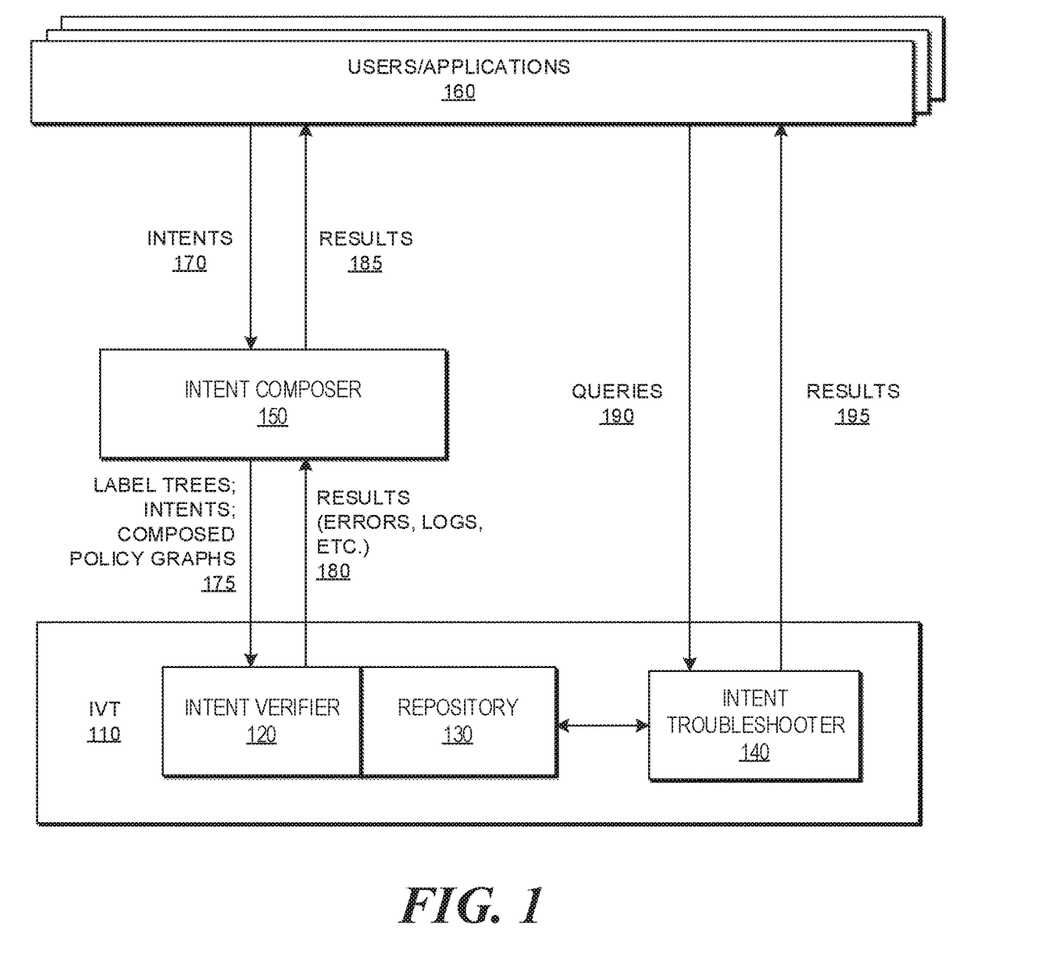
FIG. 1 is a block diagram of an example system environment for verifying whether connectivity in a composed policy graph reflects a corresponding policy in input policy graphs.

FIG. 1 is a block diagram of an example system environment for verifying whether connectivity in a composed policy graph reflects a corresponding policy in input policy graphs. FIG. 1 includes an intent verification and troubleshooting system (IVT) 110, an intent composer 150, and a plurality of users and/or applications 160.

Intent composer 150 generally can combine network policies represented in a graphical form (e.g., input network policy graphs) into a composed network policy that can be used to govern communications in a network. Network policies can be provided for governing communications of data in a network. Intent composer 150 can receive intents from users and/or applications 160, and can share results 185 received from IVT 110 with users and/or applications 160.

Table 1 below illustrates an example interface for defining intents. The getRelatedIntents interface can be used to get intents from a composed policy graph.

TABLE 1

```
import java.util.Collection;
/** Interface for representation of a relation between a data
structure and an intent. **/
public interface IntentMap {
/** Associate a new intent id to this object.
** @param id - The intent ID to be associated. **/
public void addIntent(Intent id);
/** Check whether this object has any relation to a specific
intent.
** @param id - The intent ID to be checked.
** @return True if it has a relation, false otherwise. **/
public boolean hasIntent(String id);
/** Return all intents related to this object.
** @return The collection of intent IDs related to this
object. **/
public Collection<Intent> getRelatedIntents( );
}
```

As used here, the term "network" can refer to an arrangement of devices and paths that allow for communications between endpoints. Examples of endpoints may include a server, a virtual machine, a client device, a subnet, an end user, and so forth. In some examples, where multiple networks are coupled to each other, a network can also be considered an endpoint. More generally, an endpoint can be a smallest unit of abstraction for which a network policy is applied.

As used herein, the term "network policy" can refer to a specification of at least one characteristic of communications allowed between endpoint groups (EPGs). Here, each endpoint group (EPG) may include one or multiple endpoints. Examples of characteristics that can be specified by a network policy may include, but are not limited to, port numbers to use for communications between respective EPGs, one or multiple service functions to apply to data that is communicated between respective EPGs, and/or other characteristics. A "port number" can refer to a Transmission Control Protocol (TCP) port number. In other words, a "network policy" can specify a behavior of a portion of a network in processing data (e.g. data packets). The processing of data packets can include forwarding data packets, modifying data packets (such as by changing values of headers of the data packets, dropping the data packets, etc.), applying service functions, and/or other types of processing.

As used herein, the term of "service functions" can refer to service function box models, which may include a load balancer (LB) to balance data communication load across multiple devices, protection services (such as firewall protection, intrusion detection, network authorization or authentication, etc.), network address translation (to translate an address of a data packet between a first address and a second address), a byte counter to count the size of data packets, and/or other service functions. A service function box can refer to a hardware device or a program (instructions stored on non-transitory machine-readable or machine-executable medium) configured to perform a respective service function.

IVT 110 can verify correctness of graph-based high-level network policy intent compositions, and troubleshoot the cause when a network policy violation is detected. Specifically, IVT 110 includes an intent verifier 120, a repository 130, and an intent troubleshooter 140. Using various graphical tools, such as, Policy Graph Abstraction (PGA), for representing and composing high-level network policy intents, IVT 110 can receive inputs, including but not limited to, label trees, intents in the form of policy graphs, and composed policy graph 175.

A "PGA" can include vertices that represent respective endpoint groups (EPGs), and an edge between the vertices that represents allowed communications between the EPGs. Table 2 below shows an example source code representation of a composed policy graph. The related intents field in the composedGraph can provide relation information between an edge in the composed graph and input intents

TABLE 2

```
{
    "hierarchy" : {
        "nodes": [
            { "id": "Employees", "label": "Employees" },
            { "id": "Marketing", "parent": "Employees", "label": "Marketing" },
            { "id": "Engineering", "parent": "Employees", "label": "Engineering" },
            { "id": "Campus", "label": "Campus" },
            { "id": "CampusA", "parent": "Campus", "label": "CampusA"},
            { "id": "CampusB", "parent": "Campus", "label": "CampusB"}
        ],
        "relations": [
            { "nodes": [{"id": "CampusA"}, {"id": "Engineering"}]},
            { "nodes": [{"id": "CampusB"}, {"id": "Marketing"}]}
        ]
    },
    "intents" : [
        {
            "id": "CampusA_CampusB",
            "edges": [
                {
                    "src": { "id": ["CampusA"] },
                    "dst": { "id": ["CampusB"] },
                    "constraints": ["dport=80"],
                    "type": "CAN_ALLOW"
                }
            ]
        }
    ],
    "composedGraph": [
        {
            "src": { "id": ["CampusA", "Engineering"]},
            "dst": { "id": ["CampusB", "Marketing"]},
            "constraints": ["dport=80"],
            "relatedIntents": ["CampusA_CampusB"]
        }
    ]
}
```

As used herein, an endpoint (EP) generally refers to a smallest unit for policy enforcement (e.g., a virtual machine, a container, a network port, a device, etc.). Endpoint (EP) is used interchangeably with the term Entity in this disclosure. As used herein, an endpoint group (EPG) generally refers to a set of EPs that satisfy a membership predicate (e.g., a Boolean expression) defined over the labels. For example, an EPG defined as "Tenant: Lee & Location: Zone-1 & Security: Normal" may mean a set of virtual machines owned by Tenant "Lee," placed in Zone-1, and with Normal security status in case that the EP is VM.

As used herein, a label generally refers to a membership predicate, a Boolean valued function representing an entity attribute (e.g., an owner, a network name, a placement location, a security status, etc.). An attribute can be either static (e.g., VM ownership) or dynamic (e.g., security status, VM location). Policy-driven management of cloud, IT, and/or network infrastructure often uses logical labels, tags, or metadata to define a group of policy target entities upon which network policies can be applied. Writing policies using labels in a label namespace allows the network policies to be kept at a high-level, reusable and portable. These labels and the relationships between the labels can be represented in the form of a tree structure, which is also known as a "label tree."

Then, intent verifier 120 can perform verification to determine whether the composed policy graph is correct in light of the input label trees and intents. Moreover, intent verifier 120 can answer why the composed policy graph is correct or incorrect. Next, intent verifier 120 can return verification results 180, which also includes errors, logs, etc., to intent composer 150.

Repository 130 generally can store the input intents and composed policy graphs. In some examples, repository 130 can be a component within intent verifier 130, and can receive inputs from intent composer 150 so that intent composer 150 can share the input policy graphs and the composed policy graph with intent verifier 120 through repository 130. In some examples, repository 130 can be a separate component in IVT 110. When intent verifier 120 receives the input policy graphs and the composed policy graph from intent composer 150, intent verifier 120 can store the inputs in repository 130 and share the inputs (as well as verification results in some examples) with intent troubleshooter 140 through repository 130. In some examples, repository 130 can receive the inputs (e.g., label trees, intents, composed policy graph) 175 from intent composer 150 and receive the verification results 180 from intent verifier 120, and share them with intent troubleshooter 140.

In addition, IVT 110 can receive queries 190 from users and/or applications 180 for troubleshooting at the logical level using the verified composed policy graph. Intent troubleshooter 140 can answer reachability questions at an infrastructure level. Using intent verifier 120, the composed policy graph can be verified at a logical level without any endpoint specific information. With intent troubleshooter 140, IVT 110 can further answer queries 190 at an endpoint level. For example, queries 190 may include questions, such as: (1) Can endpoint A communicate with endpoint B using port X? (2) Is endpoint A, member of EPG X, reachable to endpoint B, member of EPG Y? (3) Could adding policy X prevent endpoint A from being able to reach endpoint B? (4) What policies does this new policy conflict with? etc.

FIGS. 2A-2E are block diagrams illustrating example intent-based graphical policy compositions of such compositions. As shown in FIGS. 2A-2E, PGAs generally are application-level graphs that users can easily express their diverse network policies as if they are to draw whiteboard diagrams. In these figures, a circle node can refer to a set of endpoints, whereas every network policy (e.g., security policies, Quality-of-Service policies and middlebox policies) can clearly be captured on the edge connecting a pair of communicating nodes. Input policy graphs shown in FIGS. 2A-2D illustrate four example PGA graphs representing real network polices.

Figure 2A:
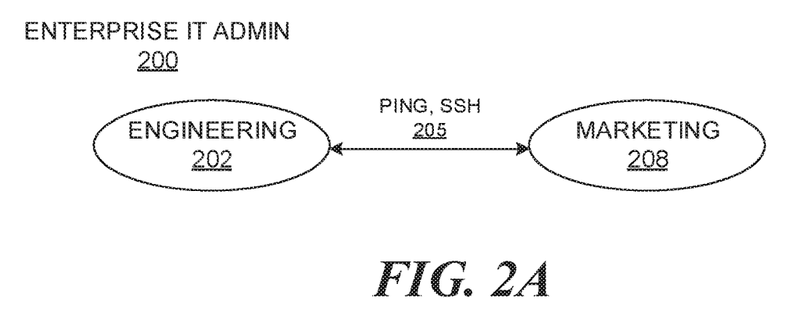
FIGS. 2A-2E are block diagrams illustrating example intent-based graphical policy compositions of such compositions.

Specifically, FIG. 2A is a block diagram illustrating an example input policy graph for enterprise IT administration 200. In this example, the policy domain of enterprise IT administration 200 includes two different entities, namely an engineering department ("Engineering") 202 and a marketing department ("Marketing") 208. The edge 205 with double arrows connecting Engineering 202 and Marketing 208 can indicate the allowed communications between the two entities. Here, edge 205 may indicate that the two entities can communicate with each other via ping or secure shell (SSH). In this example, ping can be used to test the reachability of a host on an Internet Protocol (IP) network by measuring the round-trip time (RTT) for messages sent from the originating host (e.g., a client device in Engineering 202) to a destination computer (e.g., a client device in Marketing 208) that can echo back to the source of the messages. Moreover, SSH can refer to a cryptographic network protocol for operating network services securely over an unsecured network, for example, allowing remote user login (e.g., by a client device in Engineering 202) to computer systems (e.g., a host in Marketing 208), and vice versa.

Figure 2B:
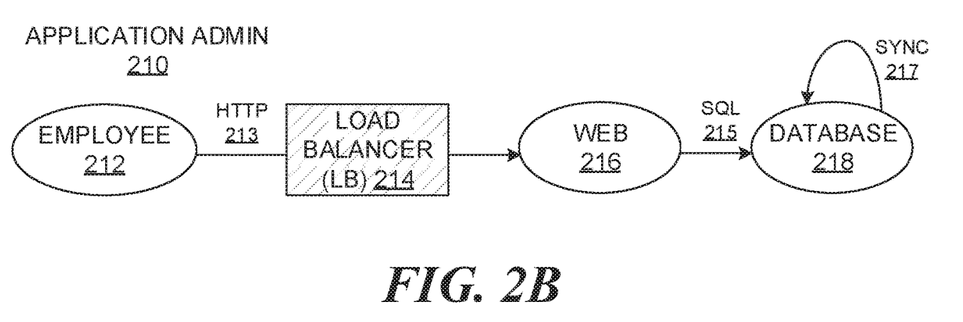

FIG. 2B is a block diagram illustrating another example input policy graph for application administration 210. In this example, the policy domain of application administration 210 may include an employee entity 212, a load balancer (LB) 214 service function, a web server 216, and a database 218. In this example, an application administrator can allow HTTP request from employees to web servers by drawing a directional edge from employee entity 212 to web server 216. Also, the traffic from the employees to web servers can go through a load-balancer 214. The edge 213 connecting employee 212 to web 216 can indicate a network policy that allows employee 212 to communicate with the web server 216 through load balancer (LB) 214 using a Hypertext Transfer Protocol (HTTP) 213. Moreover, the application administrator can also allow traffic from web servers to databases, as well as traffic from database to database. Accordingly, the edge 215 connecting web server 216 to database 218 can indicate a network policy that allows web server 216 to send Structured Query Language (SQL) queries to database 218. Edge 217 from database 218 to itself may indicate that database 218 can periodically sync up data stored in database 218.

Figure 2C:
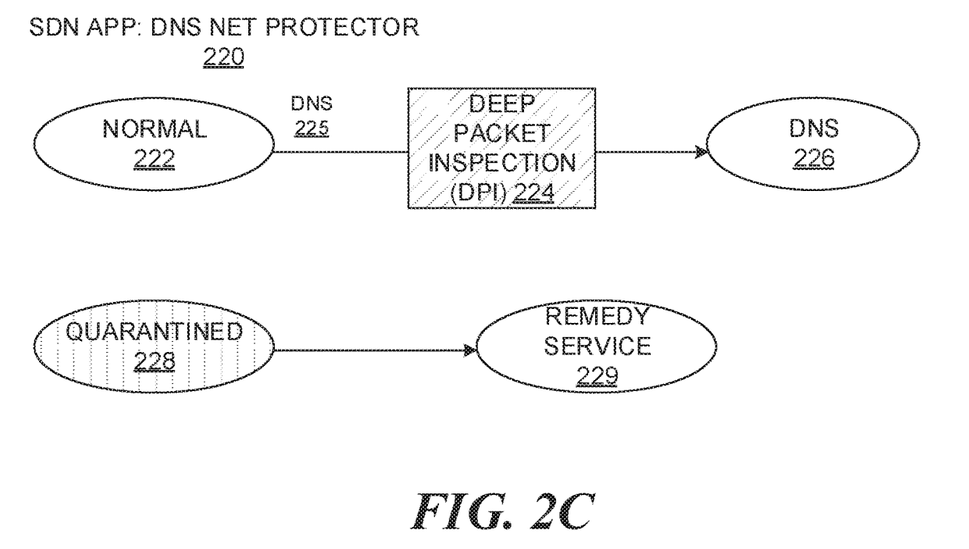

Referring now to FIG. 2C, this block diagram shows an example Software Defined Networking (SDN) application, specifically Domain Name Servers (DNS) network protector 220. In this example, DNS protector SDN application can express dynamic network policies. An example policy might be that normal hosts can use DNS, but the traffic is monitored by a Deep Packet Inspection (DPI) service function. If the DPI detects a security breach, the host is marked as quarantined and can only communicate to remedy servers. The state transitions between a normal state and a quarantined state can be determined by the SDN application. To clearly capture this access control intent, the quarantined node 228 is marked as "exclusive" using a shade, which can set an invariant that the edges of the quarantined node 228 cannot be changed, added, nor removed throughout the composition process. Accordingly, in FIG. 2C, DNS traffic 225 from network nodes in a normal state 222 can be forwarded to DNS server 226 through a DPI service function 224, On the other hand, once a network node is marked as quarantined, traffic from the network node in a quarantined state 228 are forwarded to a remedy service 229 at the remedy servers.

Figure 2D:
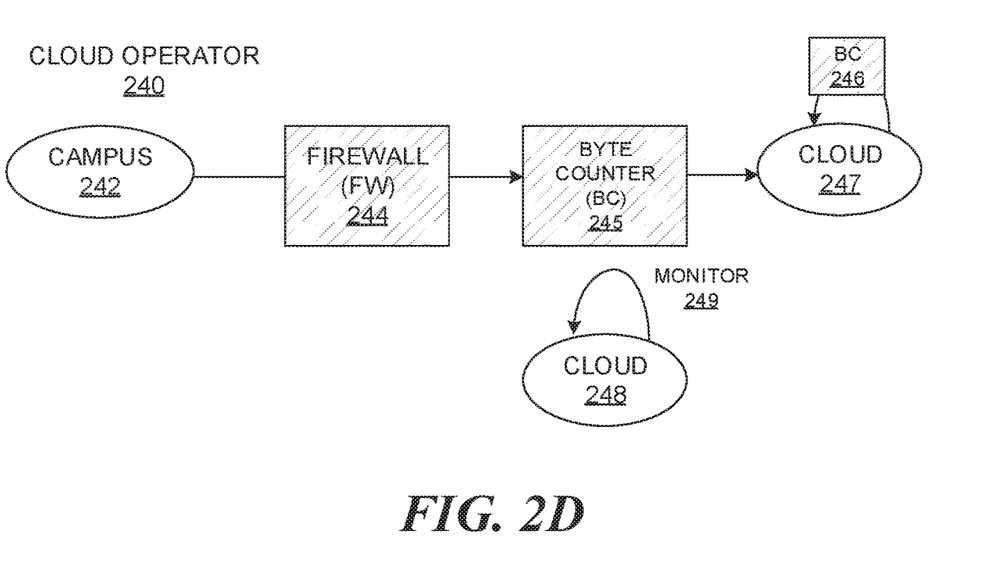

FIG. 2D illustrates a fourth example of input policy graph in a cloud operator 240 scenario. Unlike other input policy graphs, a cloud operator's input policy graph may have dotted edges. A dotted edge may represent another intent API that expresses pure service chain requirement without any Access Control List (ACL) implications. The cloud operator may place a firewall (FW) and a byte counter (BC)

chain for traffics coming from campus, but this does not mean every traffic from campus should be allowed, Therefore, such intent may be expressed as a dotted edge to be differentiated from other solid edges.

In this example, there are two entities, namely campus 242 and cloud 247. Campus 242 may include any client devices, hosts, etc., that are located in a main campus of an enterprise. On the other hand, cloud 247 may include computing and networking resources of the enterprise that are located remotely on a cloud infrastructure. The edge connecting campus 242 to cloud 247 may indicate that network traffic can be transmitted to cloud 247 through firewall (FW) 244 and byte counter (BC) 245. Also, cloud infrastructure 247 may periodically audit its traffic data through byte counter (BC) 246. Furthermore, cloud infrastructure 248 (which may be the same as or different than cloud infrastructure 247) can monitor traffic going through it per a network policy as indicated by edge 249.

The policies are defined in terms of logical labels, each representing diverse endpoint attributes, hierarchical tenant ownership, network location, or dynamic status. This may enable policy specification prior to IP address assignment. However, it is difficult to identify overlapping policies without IP addresses and/or subnet addresses. Thus, PGA can derive logical relationships between labels from external services, e.g. Keystone, Nova virtual machine placement, etc., and capture the relationships in label tree data structures. In this specific example, Department may be a superset of its child labels, namely Engineering and Marketing. Thus, the network polices for Department and Engineering are overlapped and should be composed together in the composed policy graph.

Figure 2E:
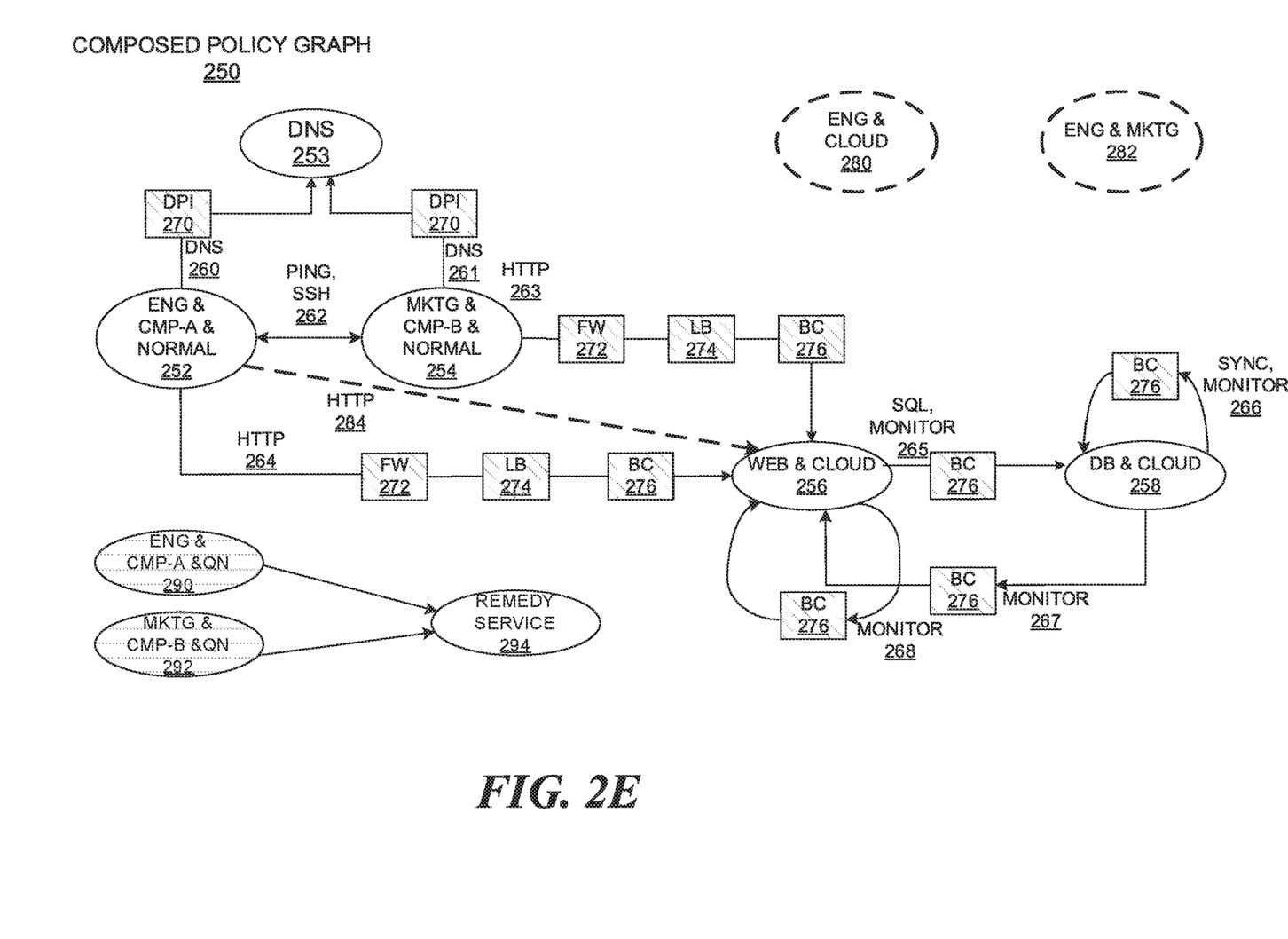

FIG. 2E represents an example composed policy graph that is combined from the four input policy graphs as shown in FIGS. 2A-2D. Using these constructs, intent composer 150 can automatically compose input policy graphs into a single coherent composed policy graph that correctly captures the intents of each individual input policy graphs. For example, in the composed policy graph, Eng&CMP-A&QN 290 has a limited access to remedy service 294, whereas Eng&CMP-A&NORMAL 252 can send traffic to many other nodes.

More specifically, composed policy graph 250 may include a plurality of endpoint groups (EPGs), such as, ENG & CMP-A & Normal 252 (EPG 252), DNS 253 (EPG 253), MKTG & CMP-B & NORMAL 254 (EPG 254), WEB & CLOUD 256 (EPG 256), DB & CLOUD 258 (EPG 258), ENG & CLOUD 280 (EPG 280), ENG & MKTG 282 (EPG 282), ENG & CMP-A & ON 290 (EPG 290), MKTG & CMP-B & QN 292 (EPG 292), REMEDY SERVICE 294 (EPG 294), etc. Note that the EPGs in the composed policy graph are disjoint with each other. Thus, each client device may belong to exactly one EPG in the composed policy graph.

Here, ENG & CMP-A & Normal 252 generally includes client devices that are associated with engineering department, on campus A, and in a normal state; DNS 253 generally refers to DNS servers; MKTG & CMP-B & NORMAL 254 generally includes client devices that are associated with marketing department, on campus B, and in a normal state; WEB & CLOUD 256 generally refers to web servers that are on a cloud infrastructure; DB & CLOUD 258 generally refers to databases that are on a cloud infrastructure; ENG & CLOUD 280 generally refers to client devices that are associated with engineering department and on a cloud infrastructure; ENG & MKTG 282 generally refers to client devices that are associated with both engineering department and marketing department; ENG & CMP-A & QN 290 generally refers to client devices that are associated with the engineering department, on campus A, and in a quarantined state; MKTG & CMP-B & QN 292 generally refers to client devices that are associated with marketing department, on campus B, and in a quarantined state; and REMEDY SERVICE 294 generally refers to client devices that are under remedy services.

In addition, the composed policy graph in FIG. 2E also includes a plurality of service functions, such as, a deep packet inspection (DPI) service function 270, a firewall service function 272, a load balancer service function 274, a byte counter service function 276, etc.

Moreover, the directional edges may indicate the type of network communications allowed between connected EPGs. For example, in the composed policy graph, DNS queries 260 and 261 are allowed to DNS server 253 from EPG 252 and EPG 254 respectively. Both ping and SSH type of communications 262 are allowed between EPG 252 and EPG 254. HTTP requests (e.g., HTTP 263, HTTP 264) are allowed from EPG 252 and EPG 254 to EPG 256 respectively, each going through a plurality of service functions including FW 272, LB 274, and BC 276. Both EPG 256 and EPG 258 can self-monitor (e.g., monitor 268 & monitor 266), as well as monitor each other (e.g., monitor 265 and monitor 267) through BC 276. Also, EPG 256 may send SQL query (SQL 258) to EPG 258 through BC 276. Further, EPG 258 can sync its data (sync 266) through BC 276. On the other hand, the EPGs in quarantined nodes (e.g., ENG & CMP-A & QN 290 and MKTG & CMP-B & ON 292) can only communicate with remedy service 294.

Additionally, metadata can be appended to the composed policy graph for troubleshooting purposes. The metadata can describe the annotation of such information as the reason for disallowance of a communication between endpoints of EPGs and information regarding the original input intents reflected on the edges of the composed graph. Moreover, metadata according to examples herein can include annotations on both the edges and the nodes of the composed policy graph. Given that the composition stage of PGA can translate input policy graphs' EPGs into EPGs with globally disjoint membership, the nodes of a PGA-composed policy graph may represent only mutually exclusive EPGs. Therefore, metadata annotation on the nodes of the composed graph can also be used to keep track between the original input policy graphs' EPGs and the resulting disjoint EPGs of the composed graph.

Nevertheless, during composition of the plurality of input policy graphs illustrated in FIGS. 2A-2D, errors may occur in the composed policy graph. For example, there may be redundant policies or wrong EPGs in the composed policy graph. For example, ENG & CLOUD 280 and ENG & MKTG 282 in FIG. 2E represent wrong EPGs that do not belong to the correct composed policy graph. The edge HTTP 284 from ENG & CMP-A & NORMAL 252 to WEB & CLOUD 256 represents a redundant policy that erroneously created during composition. The system can identify such errors after validate the sub-graphs if there exist any remaining sub-graphs that have not been examined.

Note that each of FIGS. 2A-2D is a graphical representation of high-level intents in a different scenario. Although only four examples are given here, intent composer 150 can combine any number of intents 170 from any number of different scenarios (for example, as represented in FIGS. 2A-2D) into a single composed policy graph (as represented in FIG. 2E). The composed policy graph could be quite complex to manually generate when there are hundreds or thousands of input policy graphs.

For intent verification, the system can provide answers to correctness questions, which include but are not limited to: (a) Did any new intent emerge as a result of the composition? (b) Are all original policies reflected in the composed graph? (c) Is there any edge in the composed graph that does not match to a policy in the input policies? (d) If so, can legitimate reasons be identified as the cause? (e) Can the edges of the composed graph be resolved if there are composed policies that do not match input policies? (f) Can members of EPG A communicate to members of EPG B?

To verify whether a composed policy graph can correctly reflect and contain the composition of the individual intents, the verification approach should be performed in two different directions: (a) starting from the individual intents towards the composed policy graph, and (b) starting from the composed graph and try to identify each individual intent noting the reasons why an original policy might not be present. Such a two-way verification approach may enable the system to track which edge in the composed policy graph contains each input policy and vice-versa.

Specifically, the verification may start with the composed policy graph annotated with the relevant metadata, as well as the original input intents. First, the system can break down the composed policy graph into a series of individual edges together with the source and destination nodes that each edge interconnects. Each individual edge and the corresponding source/destination nodes are referred to as a sub-graph.

Next, for each input policy graph, the system can identify a subset of the sub-graphs that contain, as source node, any disjoint part of the original source EPG as identified by the EPG metadata. Then, from the selected subset of sub-graphs, the system can further identify those sub-graphs that contain, as destination node, any disjoint part of the original destination EPG as identified by the EPG metadata. Thereafter, for each selected sub-graph, the system can verify that connectivity reflects the policy of the original input graph.

In other words, the system can verify whether the input policy graph contains an edge representing that communication is allowed, and whether any network function is required at that edge. If communication is not allowed in contradiction of the original input policy, the system can use the edge metadata information to identify whether the communication is blocked due to legitimate composition with other input policy graphs. Otherwise, the system can flag the resulting violation in the composed policy graph.

Once a sub-graph is examined, the system can remove, from the sub-graph, any classifier information associated with the input policy graph. If no other input policy graph is associated with the sub-graph as determined by the edge metadata, the system can then mark the sub-graph as verified.

For example, an example sub-graph may include two EPGs, namely ENG & CMP-A & NORMAL 252 and MKTG & CMP-B & NORMAL 254, and an edge PING, SSH 262 between the two EPGs in the composed policy graph as in FIG. 2E. The system can map the source node ENG & CMP-A & NORMAL 252 to ENGINEERING 202 in the input policy graph as illustrated in FIG. 2A. Likewise, the system can map the destination node MKTG & CMP-B & NORMAL 254 to MARKETING 208 in the input policy graph as illustrated in FIG. 2A. Furthermore, the system can map the edge PING, SSH 262 from the composed policy graph to PING SSH 205 in the input policy graph. Therefore, the example sub-graph is verified.

In addition, the system can use the label tree information and the per-node metadata to keep track of the individual EPG memberships from the composed policy graph. Here, label tree generally refers to a tree data structure that can be used to represent label relations. An arrow in the label tree from a parent label to a child label may indicate that the child label represents a subset that belongs to a set represented by the parent label. Also, the system can join the individual EPGs to check that the joined set corresponds to the entire EPG described in the original input policy graph. If the individual sub-graphs have been validated for disjoint EPGs that conform to both the source and destination EPGs in the original input policy graphs, the input policy graph has been validated.

After the input policy graphs have been validated, any remaining sub-graphs that have not been examined represent unintended reachability introduced by the composed policy graph. Connectivity beyond that specified by the original input policies represents a compromise in the correctness of the composed policy graph and may be flagged as such.

Besides verification, the system can also perform troubleshooting. In terms of troubleshooting, the system can answer reachability questions at the infrastructure level. Through the verification process, the composed policy graph can be verified at the logical level without any endpoint specific information. With troubleshooting, the system can answer questions at the endpoint level.

For example, in this context, the system may answer questions, including but are not limited to:

Can endpoint A communicate with endpoint B using port X?

Is endpoint A, a member of EPG X, reachable to endpoint B, a member of EPG Y?

Could adding policy X prevent endpoint A from being able to reach endpoint B?

What policies does this new policy conflict with?

Starting with the verified composed policy graph, to troubleshoot network connectivity issues, the system can identify the original EPG in the input policy graph that the source endpoint in the verified composed policy graph belongs to. Then, the system can identify the original EPG in the input policy graph that the destination endpoint in the verified composed policy graph belongs to. Next, the system can check whether both of the original EPGs are a part of an input policy that allows the communication between them. If such input policy exists, then the system can annotate the input policy in the metadata corresponding to the edge between the EPGs in the verified composed policy graph.

Given that each host can be a member of one EPG in the composed policy graph, the system may identify the particular sub-graph that interconnects the original EPGs containing the source and destination endpoints. If communication is allowed according to the resulting composed policy graph because no legitimate reason from the composition of the different input policies has been marked as the reason for the lack of communication, then the network connectivity most likely can be attributed to an EPG membership error. As a result, an alert including the likely mis-mapped EPG may be raised to the network administrator.

Figure 3:
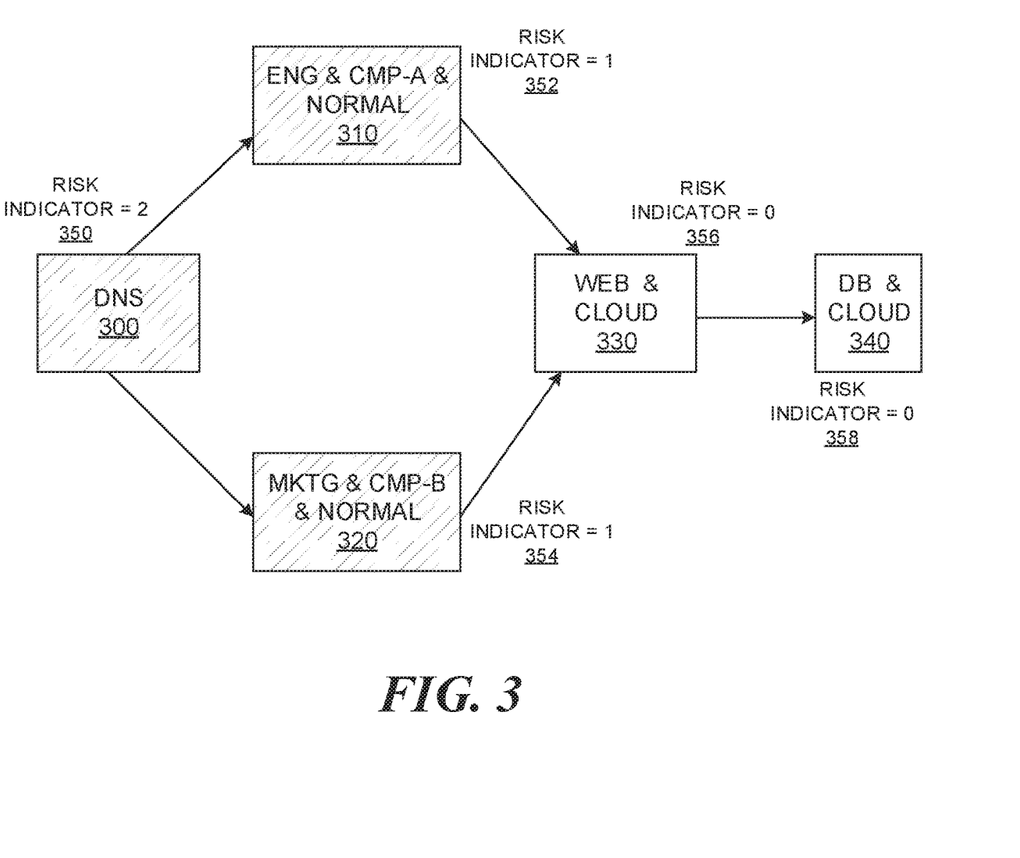
FIG. 3 is a block diagram illustrating an example networking risk assessment through troubleshooting against a verified composed policy graph.

Alternatively, troubleshooting can also provide network risk assessment. FIG. 3 is a block diagram illustrating an example networking risk assessment through troubleshooting against a verified composed policy graph. FIG. 3 includes a plurality of EPGs, including but not limited to, DNS server 300, a host from WEB & CLOUD 330, a host from DB & CLOUD 340, ENG & CMP-A & NORMAL 310, MKTG & CMP-B & NORMAL 320, etc. Risk assessment according to examples herein can answer questions, such as: What if a host from WEB & CLOUD 330 is compromised? What EPGs might be able to reach host 'x' through intermediate compromised host?

In addition, the system can assign risk indicators to each EPG in the policy graph. Risk indicators may be composed using different data points. For example, the number of compromised hops or the number of network functions traversed can be used to assign the risk indicator value to the EPGs. In the example illustrated in FIG. 3, DNS 300 has a risk indicator 350 value of 2, which indicates it is probably compromised; ENG & CMP-A & NORMAL 310 has a risk indicator 352 value of 1, which indicates it is possibly compromised since it is one hop away from DNS 300; MKTG & CMP-B & NORMAL 320 has a risk indicator 354 value of 1, which indicates it is possibly compromised since it is one hop away from DNS 300; WEB & CLOUD 330 has a risk indicator 356 value of 0, which indicates that it is unlikely to be compromised since it is two hops away from DNS 300; DB & CLOUD 340 has a risk indicator 358 value of 0, which indicates that it is unlikely to be compromised since it is three hops away from DNS 300; etc. Therefore, for risk assessment, the example system can answer questions, such as, what if a host from a specific EPG is compromised, and what EPGs might be able to reach a host 'x' through the intermediate compromised host.

Furthermore, troubleshooting can detect whether an intent can be added to, removed from, or revised in the composed policy graph without violating existing policies. To do this, the system can compose the intent as an input to the policy graph, and compared the resulting policy graph with the composed policy graph to determine whether there is any conflict. If a conflict exists, then the intent cannot be added to, removed from, or revised in the composed policy graph.

Figure 4:
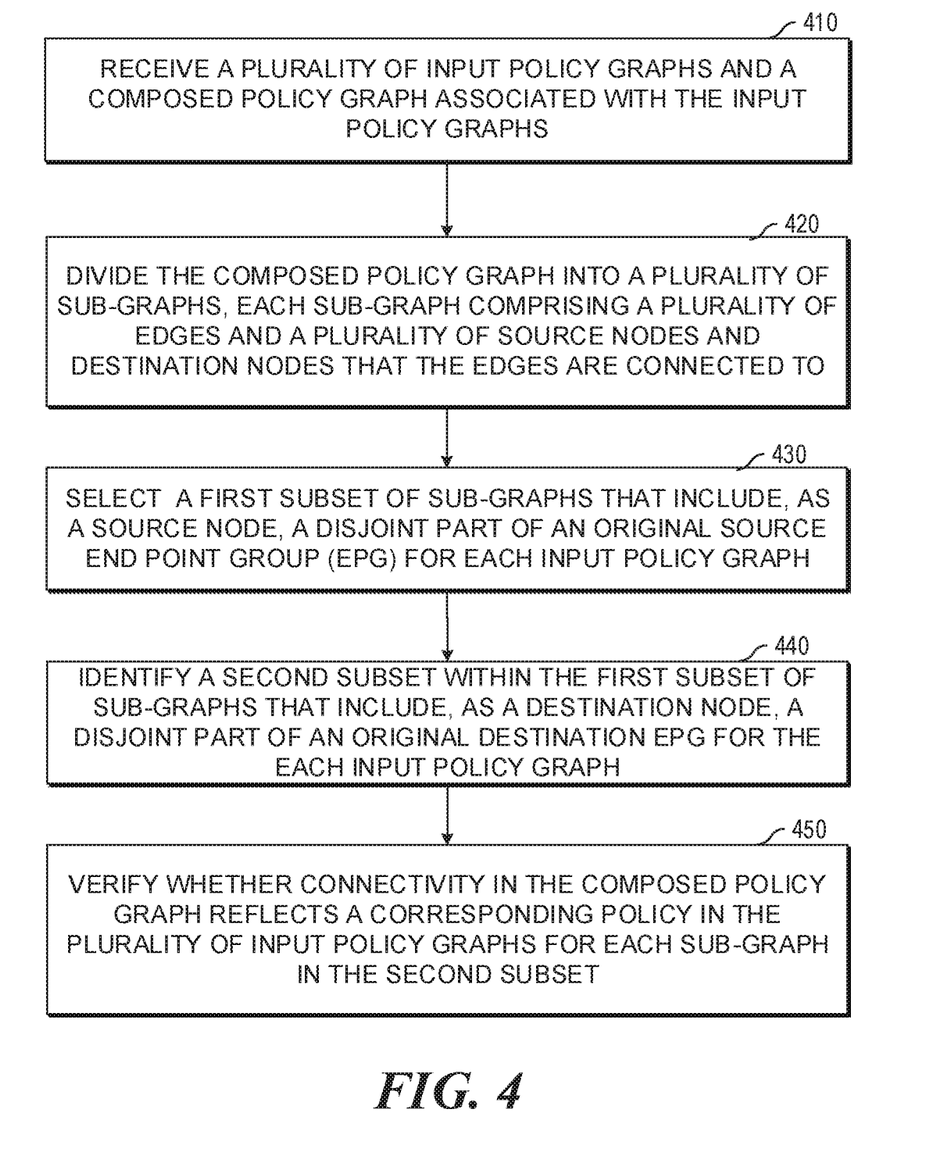
FIG. 4 is a flowchart of an example process of verifying whether connectivity in a composed policy graph reflects a corresponding policy in input policy graphs.

Processes of Verifying Whether Connectivity in a Composed Policy Graph Reflects a Corresponding Policy in Input Policy Graphs FIG. 4 is a flowchart of an example method (e.g., process) of verifying whether connectivity in a composed policy graph reflects a corresponding policy in input policy graphs. During operations, a network device can receive a plurality of input policy graphs and a composed policy graph associated with the input policy graphs (operation 410). Then, the network device can divide the composed policy graph into a plurality of sub-graphs, each sub-graph comprising a plurality of edges and a plurality of source nodes and destination nodes that the edges are connected to (operation 420). Next, the network device can select, by the network device, a first subset of sub-graphs that include, as a source node, a disjoint part of an original source end point group (EPG) for each input policy graph (operation 430). Further, the network device can identify a second subset within the first subset of sub-graphs that include, as a destination node, a disjoint part of an original destination EPG for the each input policy graph (operation 440). Finally, the network device can verify whether connectivity in the composed policy graph reflects a corresponding policy in the plurality of input policy graphs for each sub-graph in the second subset (operation 450).

In some implementations, a network device may refer to a network controller that comprises a hardware or a combination of hardware and software that enables connection between client devices and computer networks. In some implementations, a network device may refer to a server computing device (e.g., on-premise server, private, public, or hybrid cloud server) that comprises a hardware or a combination of hardware and software that can process and/or display network-related information.

In some examples, if the network device determines that communication between the source node and the destination node in the composed policy graph contradicts to at least one input policy graph, the network device can use edge metadata information to identify whether the communication is blocked due to a legitimate composition with other input policy graphs. If the edge metadata information indicates that the communication is blocked without the legitimate composition with the other input policy graphs, the network device can indicate a particular edge between the source node and the destination node in the composed policy graph as a network policy violation.

In some examples, the network device can remove, from the second subset of sub-graphs, classifier information associated with the plurality of input policy graphs. If no input policy graph is associated with the second subset of sub-graphs, the network device can indicate that the second subset of sub-graphs are verified.

In some examples, the network device can use label tree information and node specific metadata information to track memberships of EPGs in the composed policy graph, and join the EPGs such that the joined set corresponds to a whole set of EPGs associated with the plurality of received input policy graphs. Furthermore, if each sub-graph is validated for the disjoint parts of both the source EPG and the destination EPG in the each input policy graph, then the network device can indicate that the each input policy graph is validated. If all of the plurality of input policy graphs have been validated, the network device can classify sub-graphs that remain unexamined as incorrect connectivity introduced by the composed policy graph.

Note that the original source EPG and the destination source EPG are identified by the EPG metadata information. Also, the network device can verify that connectivity reflects the policy of the input policy graphs by verifying whether the input policy graphs include an edge indicating that communication is allowed, and whether a network function corresponds to the edge.

Figure 5:
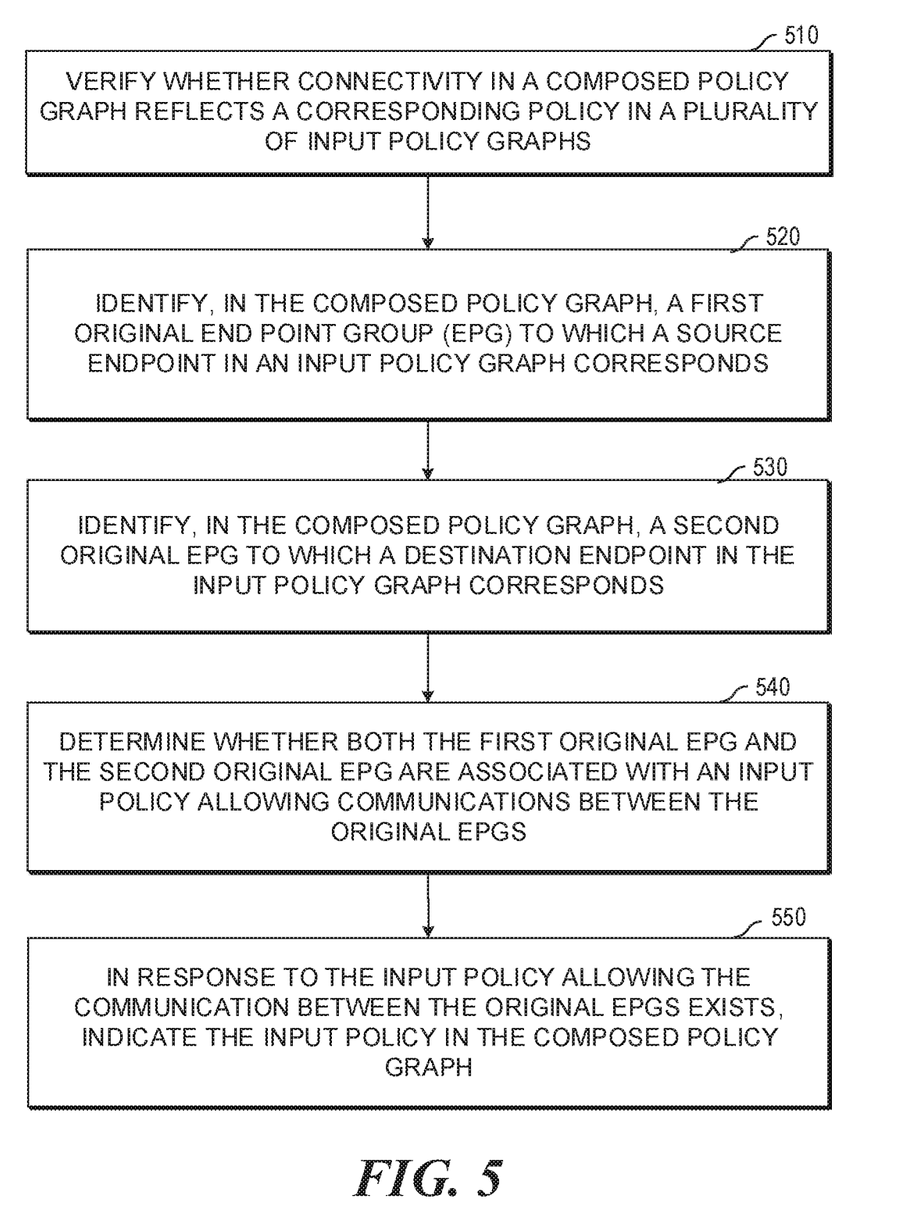
FIG. 5 is a flowchart of an example process of verifying whether connectivity in a composed policy graph reflects a corresponding policy in input policy graphs.

FIG. 5 is a flowchart of an example method (e.g., process) of verifying whether connectivity in a composed policy graph reflects a corresponding policy in input policy graphs. During operations, a network device can verify whether connectivity in a composed policy graph reflects a corresponding policy in a plurality of input policy graphs (operation 510). The network device can also identify, in the composed policy graph, a first original end point group (EPG) to which a source endpoint in an input policy graph corresponds (operation 520).

Then, the network device can identify, in the composed policy graph, a second original EPG to which a destination endpoint in the input policy graph corresponds (operation 530). Next, the network device can determine whether both the first original EPG and the second original EPG are associated with an input policy allowing communications between the original EPGs (operation 540). In response to the input policy allowing the communication between the original EPGs exists, the network device can indicate the input policy in the composed policy graph (operation 550).

In some examples, the network device can identify a particular sub-graph that interconnects the EPGs including the endpoints of which a host is a member in the composed policy graph.

In some examples, the network device can determine whether communications are allowed based on the composed policy graph. If communications are allowed without a legitimate reason from composition of the plurality of input policy graphs, the network device can send an alert comprising an incorrectly mapped EPG to a network administrator.

In some examples, the network device can determine whether a host from a particular EPG is compromised. If so, the network device can further determine which EPGs are reachable by the host through the particular compromised EPG.

Figure 6:
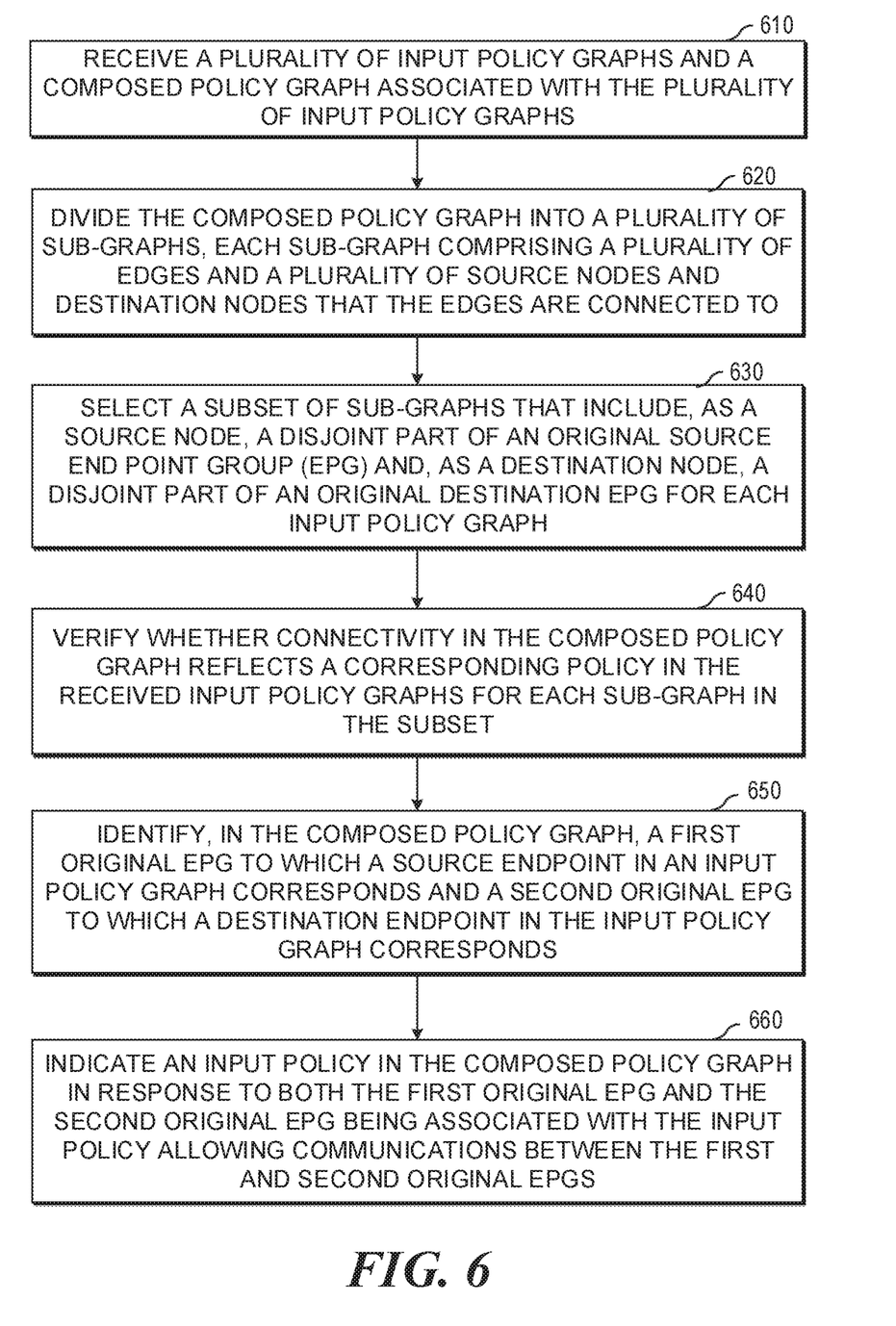
FIG. 6 is a flowchart of an example process of verifying whether connectivity in a composed policy graph reflects a corresponding policy in input policy graphs.

FIG. 6 is a flowchart of an example method (e.g., process) of verifying whether connectivity in a composed policy graph reflects a corresponding policy in input policy graphs. During operations, a network device can receive a plurality of input policy graphs and a composed policy graph associated with the plurality of input policy graphs (operation 610). Then, the network device can divide the composed policy graph into a plurality of sub-graphs (operation 620). Here, each sub-graph includes a plurality of edges and a plurality of source nodes and destination nodes that the edges are connected to. Then, the network device can select a subset of sub-graphs that include, as a source node, a disjoint part of an original source end point group (EPG) and, as a destination node, a disjoint part of an original destination EPG for each input policy graph (operation 630). Also, the network device can verify whether connectivity in the composed policy graph reflects a corresponding policy in the received input policy graphs for each sub-graph in the subset (operation 640). Further, the network device can identify, in the composed policy graph, a first original EPG to which a source endpoint in an input policy graph corresponds and a second original EPG to which a destination endpoint in the input policy graph corresponds (operation 650), Finally, the network device can indicate an input policy in the composed policy graph in response to both the first original EPG and the second original EPG being associated with the input policy allowing communications between the first and second original EPGs (operation 660).

In some examples, the network device can determine whether a host from a particular EPG is compromised, and which EPGs are reachable by the host through the particular compromised EPG.

Figure 7:
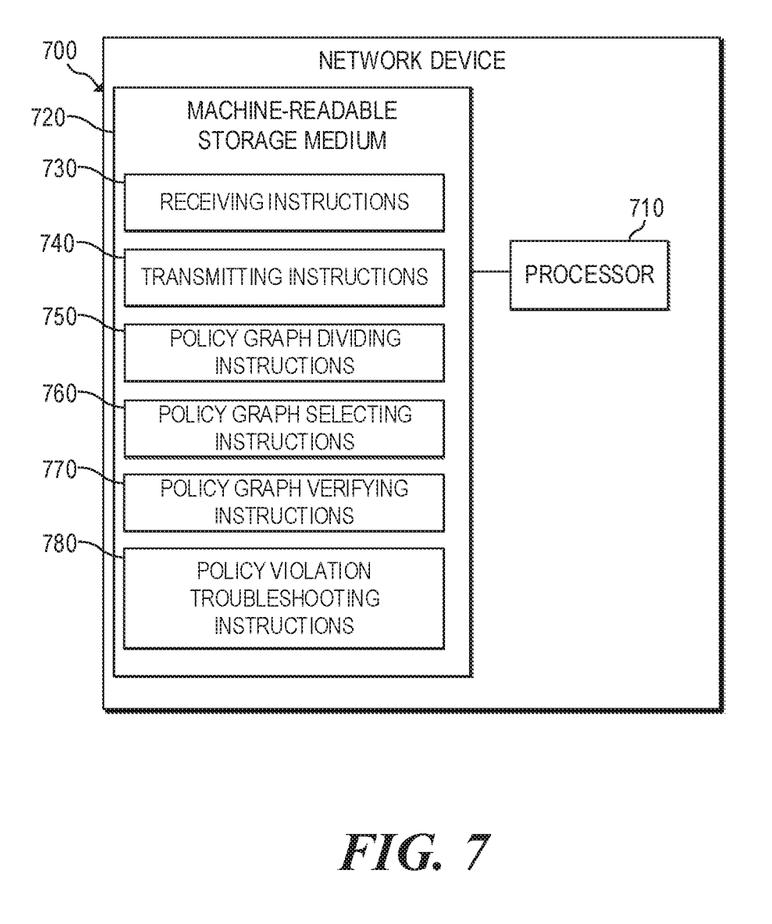
FIG. 7 is a block diagram of an example network device to verify whether connectivity in a composed policy graph reflects a corresponding policy in input policy graphs.

Network Device to Verify Whether Connectivity in a Composed Policy Graph Reflects a Corresponding Policy in Input Policy Graphs FIG. 7 is a block diagram of an example network device to verify whether connectivity in a composed policy graph reflects a corresponding policy in input policy graphs.

As used herein, a network device may be implemented, at least in part, by a combination of hardware and programming. For example, the hardware may comprise at least one processor (e.g., processor 710) and the programming may comprise instructions, executable by the processor(s), stored on at least one machine-readable storage medium (e.g., 720). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 710 may fetch, decode, and execute instructions stored on storage medium 720 to perform the functionalities described below in relation to receiving instructions 730, transmitting instructions 740, policy graph dividing instructions 750, policy graph selecting instructions 760, policy graph verifying instructions 770, and policy violation troubleshooting instructions 780. In other examples, the functionalities of any of the instructions of storage medium 720 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 7, storage medium 720 may be implemented by one machine-readable storage medium, or multiple machine-readable storage media.

Although network device 700 includes at least one processor 710 and machine-readable storage medium 720, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture), An article or article of manufacture may refer to any manufactured single component or multiple components.

Specifically, instructions 730-780 may be executed by processor 710 to: receive a plurality of input policy graphs and a composed policy graph associated with the input policy divide the composed policy graph into a plurality of sub-graphs, each sub-graph comprising a plurality of edges and a plurality of source nodes and destination nodes that the edges are connected to; select a first subset of sub-graphs that include, as a source node, a disjoint part of an original source end point group (EPG) for each input policy graph; identify a second subset within the first subset of sub-graphs that include, as a destination node, a disjoint part of an original destination EPG for the each input policy graph; verify whether connectivity in the composed policy graph reflects a corresponding policy in the plurality of input policy graphs for each sub-graph in the second subset; verify whether the input policy graphs include an edge indicating that communication is allowed; verify whether a network function corresponds to the edge; use edge metadata information to identify whether the communication is blocked due to a legitimate composition with other input policy graphs in response to determining that communication between the source node and the destination node in the composed policy graph contradicts to at least one input policy graph; etc.

Also; instructions 730-780 may be executed by processor 710 further to: indicate a particular edge between the source node and the destination node in the composed policy graph as a network policy violation in response to the edge metadata information indicating that the communication is blocked without the legitimate composition with the other input policy graphs; remove, from the second subset of sub-graphs, classifier information associated with the plurality of input policy graphs; indicate that the second subset of sub-graphs are verified in response to no input policy graph being associated with the second subset of sub-graphs; use label tree information and node specific metadata information to track memberships of EPGs in the composed policy graph; join the EPGs such that the joined set corresponds to a whole set of EPGs associated with the plurality of received input policy graphs; indicate that the each input policy graph is validated in response to each sub-graph being validated for the disjoint parts of both the source EPG and the destination EPG in the each input policy graph; classify sub-graphs that remain unexamined as incorrect connectivity introduced by the composed policy graph in response to the plurality of input policy graphs being validated; etc.

In addition, instructions 730-780 may be executed by processor 710 further to: identify, in the composed policy graph, a first original end point group (EPG) to which a source endpoint in an input policy graph corresponds; identify, in the composed policy graph, a second original EPG to which a destination endpoint in the input policy graph corresponds; determine whether both the first original EPG and the second original EPG are associated with an input policy allowing communications between the original EPGs; indicate the input policy in the composed policy graph in response to the input policy allowing the communication between the original EPGs exists; identify a particular sub-graph that interconnects the EPGs including the endpoints of which a host is a member in the composed policy graph; determine whether communications are allowed based on the composed policy graph; send an alert comprising an incorrectly mapped EPG to a network administrator in response to communications being allowed without a legitimate reason from composition of the plurality of input policy graphs; determine whether a host from a particular EPG is compromised; determine which EPGs are reachable by the host through the particular compromised EPG; etc.

We claim:
1. A method comprising:
    receiving, by a network device, a plurality of input policy graphs and a composed policy graph associated with the input policy graphs;
    dividing, by the network device, the composed policy graph into a plurality of sub-graphs, each sub-graph comprising a plurality of edges and a plurality of source nodes and destination nodes that the edges are connected to;
    selecting, by the network device, a first subset of sub-graphs that include, as a source node, a disjoint part of an original source end point group (EPG) for each input policy graph;
    identifying, by the network device, a second subset within the first subset of sub-graphs that include, as a destination node, a disjoint part of an original destination EPG for the each input policy graph;
    verifying, by the network device, whether connectivity in the composed policy graph reflects a corresponding policy in the plurality of input policy graphs for each sub-graph in the second subset;
    removing, from the second subset of sub-graphs, classifier information associated with the plurality of input policy graphs; and
    in response to no input policy graph being associated with the second subset of sub-graphs, indicating that the second subset of sub-graphs are verified.

2. The method of claim 1, further comprising:
    in response to determining that communication between the source node and the destination node in the composed policy graph contradicts to at least one input policy graph, using edge metadata information to identify whether the communication is blocked due to a legitimate composition with other input policy graphs; and
    in response to the edge metadata information indicating that the communication is blocked without the legitimate composition with the other input policy graphs, indicating a particular edge between the source node and the destination node in the composed policy graph as a network policy violation.

3. The method of claim 1, further comprising:
    using label tree information and node specific metadata information to track memberships of EPGs in the composed policy graph; and
    joining the EPGs such that the joined set corresponds to a whole set of EPGs associated with the plurality of received input policy graphs.

4. The method of claim 1, further comprising:
    in response to each sub-graph being validated for the disjoint parts of both the source EPG and the destination EPG in the each input policy graph, indicating that the each input policy graph is validated.

5. The method of claim 1, further comprising:
    in response to the plurality of input policy graphs being validated, classifying sub-graphs that remain unexamined as incorrect connectivity introduced by the composed policy graph.

6. The method of claim 1, wherein the original source EPG and the original destination EPG are identified by the EPG metadata information.

7. The method of claim 1, wherein verifying that connectivity reflects the policy of the input policy graphs further comprises:
    verifying whether the input policy graphs include an edge indicating that communication is allowed; and
    verifying whether a network function corresponds to the edge.

8. A network device, comprising at least:
    a memory;
    a processor executing instructions from the memory to:
    receive a plurality of input policy graphs and a composed policy graph associated with the input policy graphs;
    divide the composed policy graph into a plurality of sub-graphs, each sub-graph comprising a plurality of edges and a plurality of source nodes and destination nodes that the edges are connected to;
    select a first subset of sub-graphs that include, as a source node, a disjoint part of an original source end point group (EPG) for each input policy graph;
    identify a second subset within the first subset of sub-graphs that include, as a destination node, a disjoint part of an original destination EPG for the each input policy graph;
    verify whether connectivity in the composed policy graph reflects a corresponding policy in the plurality of input policy graphs for each sub-graph in the second subset
    remove, from the second subset of sub-graphs, classifier information associated with the plurality of input policy graphs; and
    in response to no input policy graph being associated with the second subset of sub-graphs, indicate that the second subset of sub-graphs are verified.

9. The network device of claim 8, wherein the processor executing instructions from the memory further to:

verify whether connectivity in a composed policy graph reflects a corresponding policy in a plurality of input policy graphs;

identify, in the composed policy graph, a first original end point group (EPG) to which a source endpoint in an input policy graph corresponds;

identify, in the composed policy graph, a second original EPG to which a destination endpoint in the input policy graph corresponds;

determine whether both the first original EPG and the second original EPG are associated with an input policy allowing communications between the original EPGs;

in response to the input policy allowing the communication between the original EPGs exists, indicate the input policy in the composed policy graph; and identify a particular sub-graph that interconnects the EPGs including the endpoints of which a host is a member in the composed policy graph.

10. The network device of claim 9, wherein the processor executing instructions from the memory further to:

determine whether communications are allowed based on the composed policy graph;

in response to communications being allowed without a legitimate reason from composition of the plurality of input policy graphs, send an alert comprising an incorrectly mapped EPG to a network administrator.

11. The network device of claim 8, wherein the processor executing instructions from the memory further to determine whether a host from a particular EPG is compromised.

12. The network device of claim 11, wherein the processor executing instructions from the memory further to determine which EPGs are connected to the host through the particular compromised EPG.

13. A non-transitory machine-readable storage medium encoded with instructions executable by at least one processor of an access point, the machine-readable storage medium comprising instructions to:

receive a plurality of input policy graphs and a composed policy graph associated with the plurality of input policy graphs;

divide the composed policy graph into a plurality of sub-graphs, each sub-graph comprising a plurality of edges and a plurality of source nodes and destination nodes that the edges are connected to;

select a subset of sub-graphs that include, as a source node, a disjoint part of an original source end point group (EPG) and, as a destination node, a disjoint part of an original destination EPG for each input policy graph;

verify whether connectivity in the composed policy graph reflects a corresponding policy in the received input policy graphs for each sub-graph in the subset;

identify, in the composed policy graph, a first original EPG to which a source endpoint in an input policy graph corresponds and a second original EPG to which a destination endpoint in the input policy graph corresponds;

indicate an input policy in the composed policy graph in response to both the first original EPG and the second original EPG being associated with the input policy allowing communications between the first and second original EPGs;

remove, from the subset of sub-graphs, classifier information associated with the plurality of input policy graphs; and indicate that the subset of sub-graphs are verified in response to no input policy graph being associated with the subset of sub-graphs.

14. The non-transitory machine-readable storage medium of claim 13, wherein the machine-readable storage medium further comprises instructions to:

use edge metadata information to identify whether the communication is blocked due to a legitimate composition with other input policy graphs in response to determining that communication between the source node and the destination node in the composed policy graph contradicts to at least one input policy graph; and indicate a particular edge between the source node and the destination node in the composed policy graph as a network policy violation in response to the edge metadata information indicating that the communication is blocked without the legitimate composition with the other input policy graphs.

15. The non-transitory machine-readable storage medium of claim 13, wherein the machine-readable storage medium further comprises instructions to:

use label tree information and node specific metadata information to track memberships of EPGs in the composed policy graph; and join the EPGs such that the joined set corresponds to a whole set of EPGs associated with the plurality of input policy graphs.

16. The non-transitory machine-readable storage medium of claim 13, wherein the machine-readable storage medium further comprises instructions to:

indicate that the each input policy graph is validated in response to each sub-graph is validated for the disjoint part of both the source EPG and the destination EPG in the each input policy graph.

17. The non-transitory machine-readable storage medium of claim 13, wherein the machine-readable storage medium further comprises instructions to:

identify a particular sub-graph that interconnects the EPGs including the endpoints of which a host is a member in the composed policy graph;

determine whether communications are allowed based on the composed policy graph; and send an alert comprising an incorrectly mapped EPG to a network administrator in response to communications being allowed without a legitimate reason from composition of the plurality of input policy graphs.

18. The non-transitory machine-readable storage medium of claim 13, wherein the machine-readable storage medium further comprises instructions to:

determine whether a host from a particular EPG is compromised; and determine which EPGs are connected to the host through the particular compromised EPG.

* * * * *